Oct. 27, 1959
C. J. SWANSON
2,909,841
EXPANDABLE RULE
Filed July 24, 1957
2 Sheets-Sheet 1
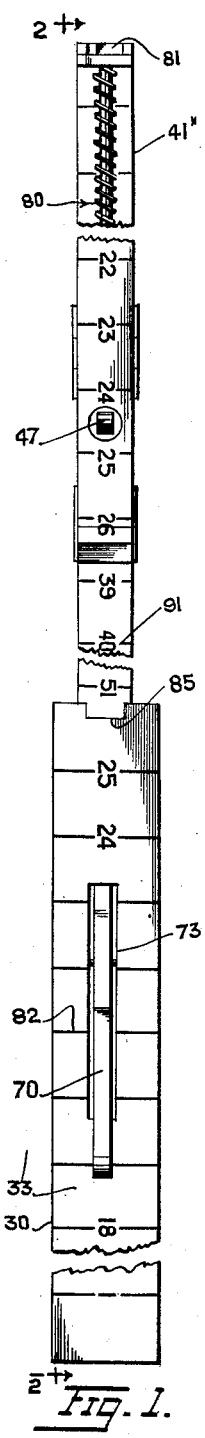
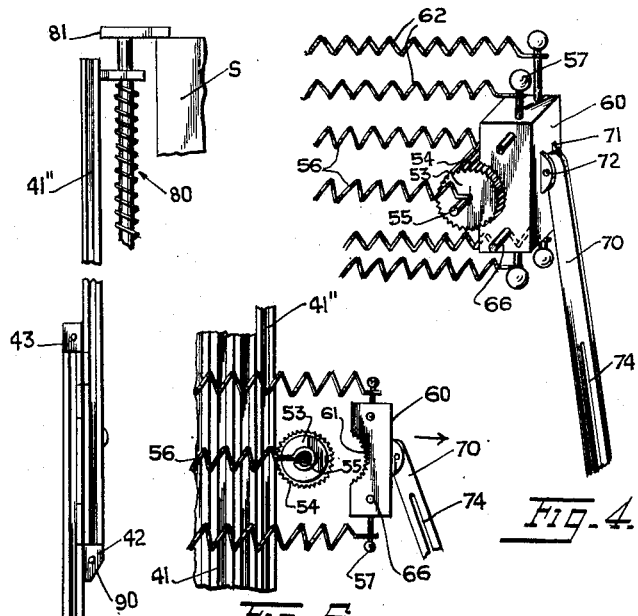
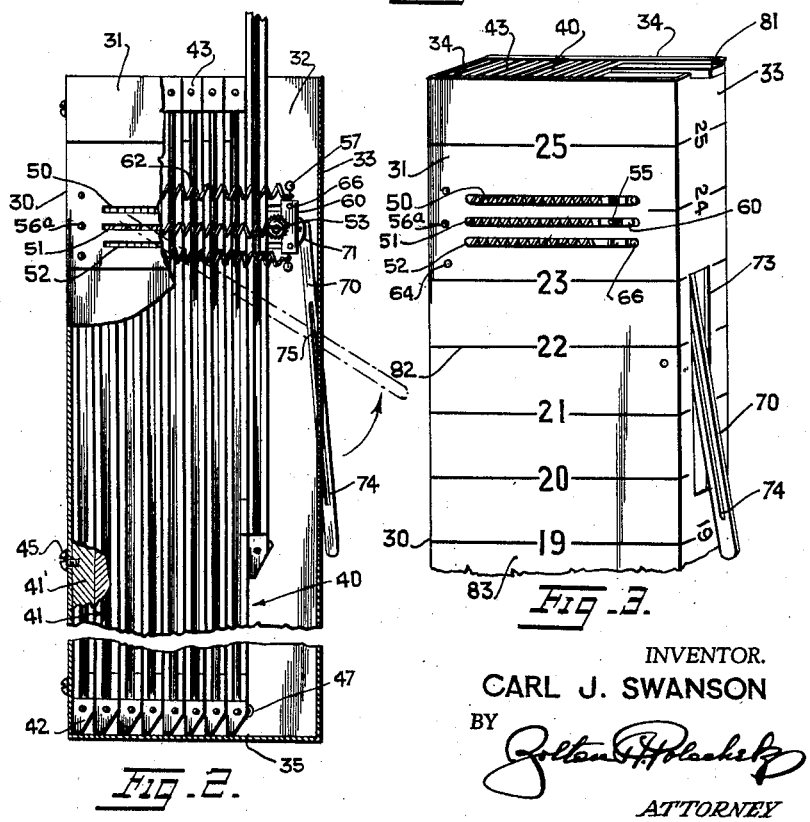
INVENTOR.
CARL J. SWANSON
BY
ATTORNEY Oct. 27, 1959
C. J. SWANSON
2,909,841
EXPANDABLE RULE
Filed July 24, 1957
2 Sheets-Sheet 2
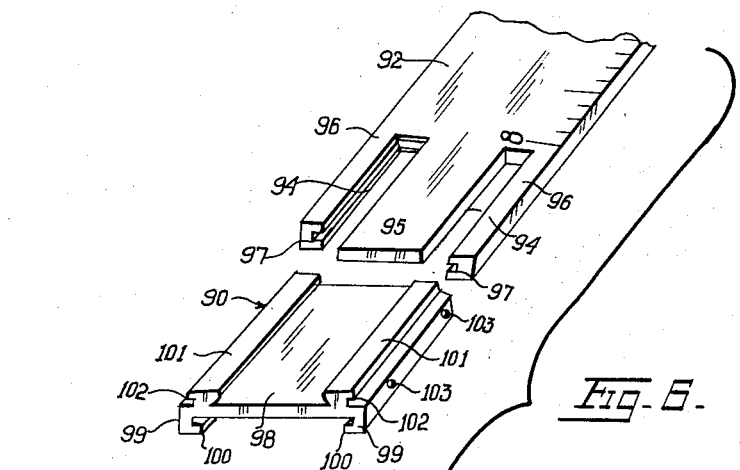
Fig. 6.
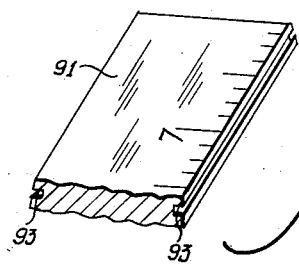
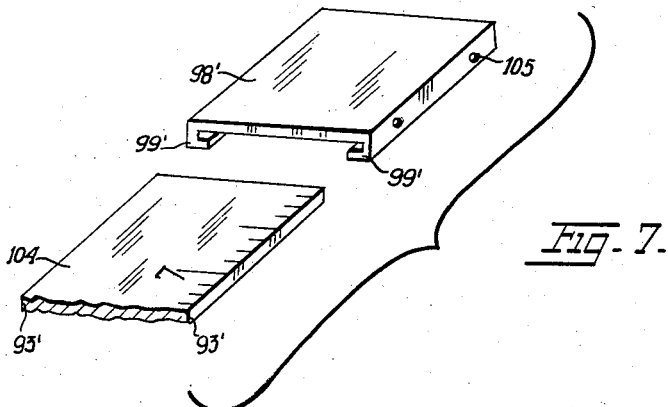
Fig. 7.
INVENTOR.
CARL J. SWANSON
BY
ATTORNEY

United States Patent Office 2,909,841
Patented Oct. 27, 1959

2,909,841

EXPANDABLE RULE

Carl J. Swanson, New York, N.Y.

Application July 24, 1957, Serial No. 673,828

6 Claims. (Cl. 33—161)

This invention relates to an extension rule, and more particularly has reference to a telescopically arranged rule having a plurality of sections. The invention especially concerns the type of extension rule disclosed in patents to Gasstrom 1,159,012 and 1,684,483.

In rules of this general type a number of elongated flat members or sections are provided which slide one upon the other. Locking means are provided between adjacent sections to lock the extended section against collapse. Unlocking devices which are manually controlled permit successive collapse of all sections. This type of rule provides for locking the sections together at their extremes of extension and retraction, but makes no provision for locking the sections in intermediate positions. When a rule is extended it very often requires that the sections be fixed at some intermediate position where the normal locking devices are ineffective.

It is, therefore, a principal object of the invention to provide an extension rule having auxiliary locking means for securing an extended section in a position intermediate its ends.

It is a further object to provide a manually-operated clutch whereby the extension and retraction of telescopic sections of a rule may be selectively controlled.

It is a further object to provide an extension rule of the character described with a casing arranged to protect the rule and serve as a support therefor, the casing containing a brake mechanism.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front elevational view of an extension rule embodying the invention.

Fig. 2 is a side elevational view partly in section, taken on lines 2—2 of Fig. 1.

Fig. 3 is a perspective view of a portion of the rule in a collapsed condition.

Fig. 4 is a perspective view of a portion of the brake mechanism in a closed position.

Fig. 5 is a side view of a portion of the brake mechanism in an open position.

Fig. 6 is a spread perspective view of a modified form of intermediate rule section joint.

Fig. 7 is a similar view of a modified form of end rule section tip.

In Figs. 1 to 3 there is shown a hollow rectangular casing 30, having an open top, flat elongated sides 31, 32, end walls 33, 34, and bottom 35. The casing is preferably formed of sheet metal. Disposed within the casing is a rule 40 having elongated channeled sections 41 of the type shown in Patents 1,159,012 and 1,684,483 above mentioned. The several sections are provided with conventional locking means 42 and 43 at opposite ends. These locking devices serve to secure the sections together when they are fully extended and when they are fully retracted. One outer section 41' is secured to side 34 by screws 45. Thus the rule is retained within case 30. When the sections are fully extended spring-biased levers 47 serve in a known manner to lock automatically the sections and permit manual control of unlocking.

According to the invention there is provided in sides 31 and 32 a plurality of parallel, transversely extending slots 50, 51 and 52. A cylindrical roller 53 having a ribbed surface 54 is supported on shaft 55, as shown in Figs. 2, 4 and 5. The ends of the shaft extend out of the roller and are slidably disposed in slots 51. Attached to the ends of the shaft are springs 56. These are coil springs which terminate at their opposite ends on pins 56a mounted in the wall 31. The shaft and roller may be moved horizontally in the case 30, being guided by slots 51. All movement of the roller is under tension of the springs 56. A brake block 60 is vertically located in the case. The block has a ribbed recess 61 arranged to engage the ribbed surface 54 of the roller. This block can be moved outwardly away from the roller 53. The block is provided at opposite ends with pins 57 on which are engaged one end of each of springs 62. The other ends of the springs 62 are engaged on pins 64 mounted in the casing side walls 31 and 32 near end wall 34. The block has a pair of outwardly extending pins 66 on each side thereof. These pins 66 are slidably mounted in the slots 50 and 52. Thus the block 60 can be moved horizontally under the tension in springs 62, being guided by slots 50 and 52. A lever arm 70 is pivotally attached to lugs 71 on the outer side of block 60. A pintle 72 secures the lever to the lugs. A vertical slot 73 is provided in end wall 33 of the casing. Lever 70 extends through this slot. The lever is provided with an elongated slot 74. A fixed pin 75 extends through this slot 74 and is supported in the opposite sides 31 and 32 of the case.

When the lever 70 is manually tilted on pin 75 the block can be disengaged from the roller as shown in Fig. 5. If desired a hook device 80 may be provided on the first section 41'' for engaging some object S from which measurement is to be made or upon which the foremost extended end may be supported. This hook device is described in my prior Patents 2,356,544 and 2,740,201. If desired, the hook bar 81 may be rigidly secured to the free end of outer section 41'' instead of having a floating mounting as shown in the drawing.

The outside of the casing is inscribed with lines 82 and indicia 83 so that the casing may serve as a rule in conjunction with the extended sections contained therein. In operation of the device the several sections will initially be fully contained within the case 30 as shown in Fig. 3. The tops of the section will be substantially flush with the open top of the case. Hook bar 81 will extend slightly out of side 33 which has a recess 85 in which the bar normally rests. When the bar 81 is pulled upwardly as indicated by arrow 86 the first section 41'' will slide out of the case if simultaneously therewith the downwardly extending end of lever 70 is pressed inwardly to end wall 33. This movement of the lever causes the block 60 to become disengaged from roller 53 so that section 41'' is free to move upwardly as indicated by arrow 87 in Fig. 5, while the roller turns on shaft 55. While the block and roller are disengaged one section after another may be extended from the case. The extended sections will automatically lock with each other by means of the conventional locking devices 42, 43 above mentioned.

When the last section being extended from the case is in an intermediate position it is possible to lock this section at this position by manually releasing the lever 70 so that it assumes the dotted line position shown in Fig. 2. Then the brake block will engage the roller and the roller will prevent slidable movement of the section. Roller 53 is preferably made of resilient materal such as rubber so that the ribs 54 frictionally engage the broad side of the partially extended section. Block 60 may have rigid or flexible ribs in the recess 61. Block 60 thus serves as a brake which is manually controlled to restrain rotation of roller 53 when necessary. When all of the sections have been extended from the case, lever 70 will assume the dotted line position shown in Fig. 2 where it serves to close the brake and selectively position the last extensible section against the fixed section 41'.

When it is desired to retract the extended sections the brake must be opened by manually pivoting lever 70 in the same manner as is required for extending the sections. It will be noted that the lower end 90 of each section is inwardly tapered so that the sections being retracted readily pass the roller 53. Thus, in order to retract the sections it is necessary to press the levers 47 in succession simultaneouly with the pivoting of lever 70.

There has thus been provided a manually controlled brake means for positioning extended sections in selected intermediate positions. The case 30 serves to protect the rule when the sections are fully retracted and also serves to secure one end of the rule in the case. In addition the case serves as part of the brake means since it is provided with the slots 50–52, and the slot 73 which engage the pins 55, 66 and 75 of the brake mechanism.

In order to measure extended lengths the rule can be made with the several sections a foot or more in length and the total length of the rule can be twelve, fourteen or more feet. If desired, the several sections can be formed of aluminum, magnesium, titanium or alloys thereof. The sections can be extruded by known metal forming processes.

When the rule is fully extended the indicia 82 on the exterior of the casing will be continuous with the indicia 91 marked on the sections.

In Fig. 7, there is illustrated a modified form of joint interlock device 90 for adjacent intermediate ruler sections 91 and 92. Ruler section 91 has channel-shaped grooves 93 along its long edges. Ruler section 92 is formed with elongated slots 94 intersecting its end edge thereby providing a central tongue portions 95 and fingers 96, 96. The fingers are formed with channel-shaped grooves 97, 97 along the inner surface thereof.

The joint interlock device 90 comprises a rectangular-shaped plate 98 with channel-shaped flanges 99 along its long edges and depending therebelow providing channel grooves 100. Similar channel-shaped flanges 101 are formed on the upper surface of the plate but spaced inwardly from the edges thereof to provide channel-shaped grooves 102 therealong.

The ruler section 91 is adapted to slide underneath the plate 98 with its grooves 93 riding over the lower flanges 99 of the plate. Similarly the ruler section 92 is adapted to slide over the top surface of the plate 98 with the grooves 102 riding over the upper flange 101 and tongue 95 riding over the plate. The joint interlock device 90 may be fastened to the end of the ruler section 91 by indentations 103 formed in the lower flanges 99.

The end ruler section 104 of the rule is provided with a plate 98' constituting a tip for the end thereof somewhat similar to plate 98 but with the upper flanges 101 omitted. The flanges 99' of the plate 98' interlock with the channel shaped grooves 93' of the end ruler section 104. The plate 98' may be secured to the ruler section by indentations 105 pressed in the flanges 99'.

While I have illustrated and described the preferred embodiments of my invention, it is to be understood that I do not limit myself to the precise constructions herein disclosed and that various changes and modifications may be made within the scope of the invention as defined in the appended claims.

Having thus described by invention, what I claim as new, and desire to secure by United States Letters Patent is:

1. An extension rule, comprising a plurality of slidably held flat, elongated rule sections in combination with cooperating joints secured on opposite ends of said sections, said joints being adapted to interlock adjacent sections in fully extended and retracted positions, and manually operable brake means arranged to lock the sections in partially extended positions, said means including a rotatable friction roller, a shaft carrying said roller, a rectangular casing enclosing said sections and having an open top, said casing having opposing flat, elongated sides with parallel slots therein, said shaft having opposite ends slidably engaged in certain of said slots, spring means tensioned on said ends of the shaft by extension from one end wall of the casing, said roller normally contacting the section most remotely located from said end wall, a lever pivotally mounted near the opposite end wall of the casing and extending through an elongated slot therein, said lever having a longitudinally extending slot, a pin extending through the slot in the lever and secured in opposite sides of the casing, a brake block, said lever being pivotally attached to the block, and other spring means tensioned on said block by movement thereof from said one end wall.

2. An extension rule, comprising a plurality of slidably held flat rule sections in combination with cooperating joints secured on opposite ends of said sections, said joints being adapted to interlock adjacent sections in fully extended and retracted positions, and manually operable brake means arranged to lock the sections in partially extended positions, said means comprising a rotatable friction roller, a shaft carrying said roller, a rectangular casing enclosing said sections and having an open top, said casing having opposiing flat, elongated sides with transverse parallel slots therein, said shaft having opposite ends slidably engaged in certain of said slots, a pair of springs each having one end engaged on one of said ends of the shaft and other ends secured near one end wall of the casing, said springs being tensioned by extension from said end wall of the casing, said roller normally contacting the section most remotely located from said end wall, a lever pivotally mounted near the opposite end wall of the casing and extending through an elongated slot therein, said lever having a longitudinally extending slot, a pintle extending through the slot in the lever and secured in opposite sides of the casing, a brake block, said lever being pivotally attached to the block, and a plurality of other springs secured near said one end wall of the casing and being tensioned on said block by movement thereof from said one end wall, said block being engaged with said roller when the brake means is closed, said lever being operative to disengage the block from the roller when the lever is manually pivoted on said pintle.

3. An extension rule comprising a plurality of slidably held flat, elongated rule sections in combination with cooperating joints secured on opposite ends of said sections, said joints being adapted to interlock adjacent sections in fully extended and retracted positions, and manually operable brake means arranged to lock the sections in partially extended positions, said means comprising a rotatable ribbed friction roller, a shaft carrying said roller, a rectangular casing enclosing said sections and having an open top, said casing having opposing flat, elongated sides with transverse parallel slots therein, said shaft having opposite ends slidably engaged in certain of said slots, a pair of coil springs each having one end engaged on one of said ends of the shaft and other ends secured near one end wall of the casing, said springs being tensioned by extension from said end wall of the casing, said roller normally contacting the section most remotely located from said end wall, a lever pivotally mounted near the opposite end wall of the casing and extending through an elongated slot therein, said lever having a longitudinally extending slot, a pin extending through the slot in the lever and secured in opposite sides of the casing, a brake block, said lever being pivotally attached to the block, a plurality of other coil springs secured near said one end wall of the casing and being tensioned on said block by movement thereof from said one end wall, said block having a recess formed to engage with said roller when the brake means is closed, said block having laterally extending pins slidably engaged in other of said parallel slots.

4. An extension rule, comprising a plurality of slidably held flat rule sections in combination with cooperating joints secured on opposite ends of said sections, said joints being adapted to interlock adjacent sections in fully extended and retracted positions, and manually operable brake means arranged to lock the sections in partially extended positions, said means comprising a rotatable friction roller, a shaft carrying said roller, a rectangular casing enclosing said sections and having an open top, said casing having opposing flat, elongated sides with transverse parallel slots therein, said shaft having opposite ends slidably engaged in certain of said slots, a pair of coil springs each having one end engaged on one of said ends of the shaft and other ends secured near one end wall of the casing, said springs being tensioned by extension from said end wall of the casing, said roller normally contacting the section most remotely located from said end wall, a lever pivotally mounted near the opposite end wall of the casing and extending through an elongated slot therein, said lever having a longitudinally extending slot, a pin extending through the slot in the lever and secured in opposite sides of the casing, a brake block, said lever being pivotally attached to the block, and a plurality of other coil springs secured near said one end wall of the casing and being tensioned on said block by movement thereof from said one end wall, said block having a recess formed to engage with said roller when the brake means is closed, said block having laterally extending pins slidably engaged in others of said parallel slots, each of said sections having a tapered bottom end for passing the roller under spring tension thereon during retraction of the sections.

5. An extension rule, comprising a plurality of slidably held flat rule sections in combination with cooperating joints secured on opposite ends of said sections, said joints being adapted to interlock adjacent sections in fully extended and retracted positions, manually operable brake means arranged to lock the sections in partially extended positions, said means including a rotatable friction roller, a shaft carrying said roller, a rectangular casing enclosing said sections and having an open top, said casing having opposing flat, elongated sides with transverse parallel slots therein, said shaft having opposite ends slidably engaged in certain of said slots, a pair of coil springs each having one end engaged on one of said ends of the shaft and the other ends secured near one end wall of the casing, said springs being tensioned by extension from said end wall of the casing, said roller normally contacting the section most remotely located from said end wall, a lever pivotally mounted near the opposite end wall of the casing and extending through an elongated slot therein, said lever having a longitudinally extending slot, a pin extending through the slot in the lever and secured in opposite sides of the casing, a brake block, said lever being pivotally attached to the block, and a plurality of other coil springs secured near said one end wall of the casing and being tensioned on said block by movement thereof from said one end wall, said block having a recess formed to engage with said roller when the brake means is closed, said block having laterally extending pins slidably engaged in others of said parallel slots, each of said sections having a tapered bottom end for passing the roller under spring tension thereon during retraction of the sections, the first one of said sections to be extended from the casing having a hook extension at the free end thereof, the exterior of the casing being scored with measuring indicia continuous with indicia on the sections.

6. An extension rule, comprising a rectangular casing with elongated flat, slotted sides, end walls, and bottom, with an open top, a plurality of flat elongated rule sections slidably held in the casing, said sections having cooperating joints secured to opposite ends thereof and operative to interlock adjacent sections in fully extended and retracted positions, and manually operable brake means arranged to lock the sections in selective partially extended positions, said means comprising a rotatable friction roller, a shaft carrying said roller, a pair of coil springs each having one end engaged on said shaft, a clutch block, said block having a recess formed to engage with said roller, a lever pivotally attached to said block, other coil springs each having one end secured on said block, said springs each having the other end thereof secured near one end wall of the casing, laterally extending pins disposed at the sides of the block for guiding movement in the slots in said sides, said lever having a longitudinally extending slot therein, and another pin extending through the slot in the lever and secured near the other end wall of the casing for guiding movement of the lever in actuating said brake means.

References Cited in the file of this patent

UNITED STATES PATENTS

| | | |
|---|---|---|
| 1,391,621 | Fenwirth | Sept. 20, 1921 |
| 1,684,483 | Gasstrom | Sept. 18, 1928 |
| 2,704,138 | Gibson et al. | Mar. 15, 1955 |
| 2,740,201 | Swanson | Apr. 3, 1956 |